UNITED STATES PATENT OFFICE.

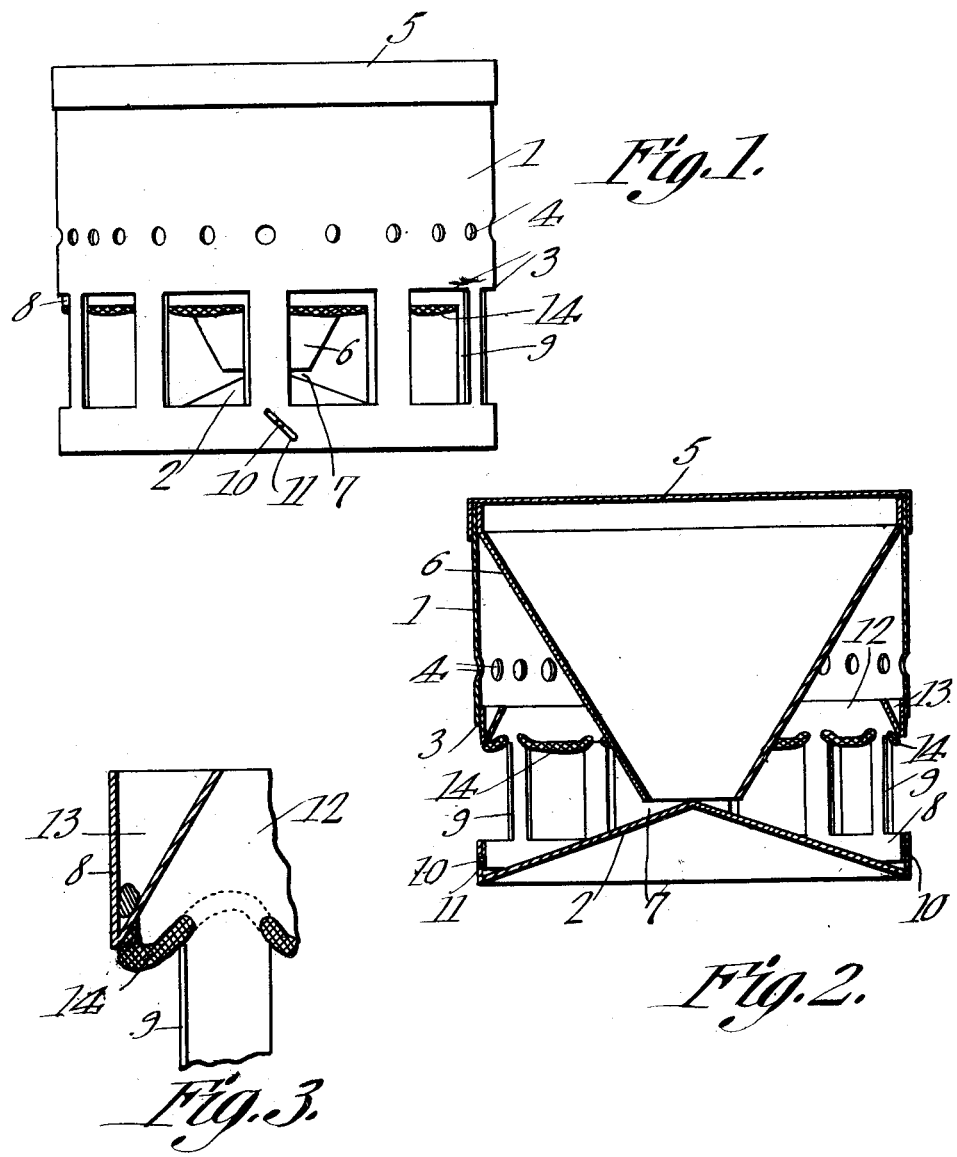

MARY E. STRICKLER, OF MEADVILLE, MISSOURI.

CHICKEN-FEEDER.

1,108,019.　　　　　　Specification of Letters Patent.　　Patented Aug. 18, 1914.

Application filed May 19, 1913.　Serial No. 768,645.

*To all whom it may concern:*

Be it known that I, MARY E. STRICKLER, a citizen of the United States, residing at Meadville, in the county of Linn and State of Missouri, have invented a new and useful Chicken-Feeder, of which the following is a specification.

The present invention appertains to a novel and improved chicken feeder and aims to provide a device of that character so constructed that the feed may be eaten therefrom by the chickens, the feed being supplied automatically as it is removed.

Another object of the present invention is to provide a device of the nature indicated which shall be adjustable to accommodate various sizes of chickens.

A further object of the present invention is to provide novel and improved means for applying a disinfectant or insecticide to the chickens as they introduce their heads into the device for eating the feed therefrom.

It is also within the scope of the invention to improve generally the construction and utility of devices of that character to which the present invention relates, in order that the device may be simple, substantial and inexpensive in construction, as well as serviceable, convenient, and efficient in its use.

With the foregoing and other objects in view which will be apparent as the description proceeds, the present invention resides in the combination and arrangement of parts and in the details of construction hereinafter described and claimed, it being understood that changes in the precise embodiment of the invention can be made within the scope of what is claimed without departing from the spirit of the invention.

The invention has been illustrated in its preferred embodiment in the accompanying drawing, wherein:—

Figure 1 is a side elevation of the feeder. Fig. 2 is a central vertical section thereof. Fig. 3 is a fragmental detail.

In carrying out the present invention, reference being had in detail to the drawing, there is provided a cylindrical case, which may be of any suitable dimensions or proportions, according to the circumstances, and which is provided with the conical bottom 2, in order that the central portion of the bottom will be raised so as to deliver the feed down to the peripheral portions of the bottom. The case 1 is provided with the circumferential series of openings 3 adjoining the bottom through which the chickens may introduce their heads, the case 1 being provided with a circumferential series of smaller openings or apertures 4 above the openings 3 to admit light and air. The case is also provided with a suitable cover 5, which may be removed.

A hopper 6 is disposed within the case 1, the upper end or mouth of the hopper fitting snugly within the upper end of the case, and the lower end or delivery opening of the hopper being disposed directly above, but spaced slightly from, the apex or central portion of the bottom 2, so as to provide the annular opening 7 leading from the hopper to the space directly above the bottom 2. The hopper 6 is adapted to be filled with suitable grain or other feed, by removing the cover or top 5.

An annular member or shutter 8 is disposed snugly within the case 1 adjoining the openings 3, and is provided with a circumferential series of openings 9 complementing the respective openings 3. The annular shutter 8 is provided with outwardly projecting lugs 10 engaging in inclined slots 11 provided in the case 1, in order that when the shutter 8 is turned, the same will be shifted vertically. In this manner, by rotating the shutter, the openings 3 may be closed more or less, so as to accommodate various sizes of chicks or chickens.

In order to apply the disinfectant or insecticide to the heads of the chickens, a ring 12 is secured within the shutter 8 directly above the openings 9, and provides an annular disinfectant channel 13 with the upper edge portion of the annular member or shutter 8 adapted to hold the disinfectant or insecticide. The inner wall 12 of the disinfectant channel is provided with apertures above the side edges of the openings 9, and a wick or absorbent element 14 is threaded through the said apertures into and out of the channel so that the exposed portions of the wick sag or hang between the side edges of the openings 9 and below the upper ends thereof. Those portions of the wick 14 within the channel 13 are designed to carry the disinfectant or insecticide to the exposed portions sagging or hanging below the upper ends of the openings, the disinfectant being fed, as needed, to the exposed portions of the wick 14.

In use, the feed within the hopper 3 is adapted to trickle through the opening 7 and down the bottom 2 where it may be readily reached by the chickens, the openings 3 being such as to admit the heads of the chickens only, and being of such proportions as to permit the chickens to readily eat the feed from the bottom 2. The feed is automatically delivered to the bottom 2, as the feed is removed from the bottom, and the wasting of the feed is thus eliminated.

By rotating the shutter 8, the sizes of the openings 3 may be adjusted, so as to accommodate various sizes of chickens, and in this manner, the openings may be reduced to a size to admit the heads of chicks only, the larger chickens being excluded, which is desirable for raising or rearing small chickens.

When the chickens introduce their heads into the openings 3 and 9, their heads will brush against or contact with the exposed portions of the wick 14, and as a result, the disinfectant or insecticide will be applied to the heads of the chickens, thus facilitating the destruction of head louse, and other germs or vermin. It is to be noted that the application of the disinfectant will remain the same notwithstanding the various adjustments of the shutter, so that the disinfectant may be applied to the heads of the small as well as large chickens. Any suitable disinfectant may be employed, grease or oil being desirable for this purpose, as is well known.

The present device is sanitary, light and airy, and the feed is readily accessible or freely exposed, which together with the other advantages, which will be apparent, render the present device an efficient one.

What is claimed as new is:—

1. In a device of the character described, a member having a plurality of openings therein, and a disinfectant channel disposed directly over the openings, one wall of the channel having apertures above the side edges of the openings, and a wick threaded through the said apertures into and out of the channel and having its exposed portions sagging between the side edges of the said openings and below the upper ends thereof.

2. In a device of the character described, a cylindrical case, an adjustable annular member disposed snugly therein and having a circumferential series of openings, the case having openings complementing the aforesaid openings, a ring secured within the annular member above the openings therein and forming a disinfectant channel with the upper edge portion of the annular member, the said ring having apertures above the side edges of the openings in the annular member, and a wick threaded through the said apertures into and out of the channel and having its exposed portions sagging between the side edges of the openings in the said annular member and below the upper ends of the said openings.

In testimony that I claim the foregoing as my own, I have hereto affixed my signature in the presence of two witnesses.

MARY E. STRICKLER.

Witnesses:
C. E. DICKSON,
W. L. THARP.